United States Patent [19]

Greenquist

[11] Patent Number: 5,413,294
[45] Date of Patent: May 9, 1995

[54] PLATFORM POSITIONED ABOVE A KEYBOARD FOR USE WITH A COMPUTER MOUSE

[75] Inventor: Marcia L. Greenquist, Westminster, Colo.

[73] Assignee: AT&T Corp., Murray Hill, N.J.

[21] Appl. No.: 173,804

[22] Filed: Dec. 23, 1993

[51] Int. Cl.$^6$ .............................................. A45D 19/04
[52] U.S. Cl. ................... 248/127; 248/205.2; 248/371; 248/918; 400/717
[58] Field of Search ............ 248/371, 127, 396, 398, 248/447, 454, 455, 464, 463, 918, 205.2; 400/713, 714, 717, 718

[56] References Cited

U.S. PATENT DOCUMENTS

| | | | |
|---|---|---|---|
| 729,919 | 6/1903 | Brown | 248/463 |
| 1,289,377 | 12/1918 | Brown | 248/464 |
| 3,117,816 | 1/1964 | De Sena | 248/463 |
| 4,546,947 | 10/1985 | Gesten | 400/718 X |
| 4,635,893 | 1/1987 | Nelson | 248/918 X |
| 4,671,688 | 6/1987 | Brashears | 400/714 |
| 4,893,775 | 1/1990 | Long | 248/918 X |
| 4,913,387 | 4/1990 | Tice | 400/717 X |
| 4,917,516 | 4/1990 | Retter | 400/489 |
| 5,119,742 | 6/1992 | Simmie | 108/152 |
| 5,129,616 | 7/1992 | Carson | 248/464 X |
| 5,246,151 | 9/1993 | Jabara | 248/205.2 X |
| 5,346,164 | 9/1994 | Allen | 248/918 X |

OTHER PUBLICATIONS

"Plight of the Modern Mouse", *Managing Office Technology*, Mar. 1994, pp. 49–50.

*Primary Examiner*—Ramon O. Ramirez
*Assistant Examiner*—Korie H. Chan
*Attorney, Agent, or Firm*—John C. Moran

[57] ABSTRACT

A mouse platform that mounts over the normally unused portion of a keyboard where the mouse is easily accessible by the right hand of the user. Further, the platform is easily removable to allow use of the normally unused portion of keyboard for the few programs that require such use. In one embodiment, the platform rests on the same surface as the keyboard but extends over the normally unused portion of the keyboard. In a second embodiment, a first part of the platform is affixed to the keyboard, a second part of the platform can be easily attached and removed from the first part. The second part is the surface on which the mouse rests. Advantageously, in the second embodiment, the first part may be Velcro strips which are glued onto the keyboard with the second part having matching Velcro strips. In a third embodiment, the second part is adjustable to compensate for the keyboard being tilted.

9 Claims, 3 Drawing Sheets

KEYBOARD 101
PLATFORM 102
LEG 104
TABLE SURFACE 103

TOP VIEW

PLATFORM 102

SIDE VIEW

LEG 105
PLATFORM 102
LEG 104

SIDE VIEW

PLATFORM POSITIONED ABOVE A KEYBOARD FOR USE WITH A COMPUTER MOUSE

TECHNICAL FIELD

The present invention relates to computer input equipment and more particular, to the position of a computer mouse with respect to a computer keyboard.

BACKGROUND OF THE INVENTION

In recent years, there has been growing use of the computer mouse in all segments of the computer industry. Normally, the computer mouse is placed on the same surface on which the computer keyboard is placed. Most of the computer programs written now required extensive use of both the mouse and keyboard. Assuming a fight handed user, the user is constantly moving their fight hand from the keyboard to the mouse and back. With newer extended keyboards, this requires the fight hand to move approximately 6.5 inches before reaching the surface on which the mouse rests. The user must then find the mouse on that surface. In addition, when user moves the right hand back to the home keys on the keyboard, it is difficult to position the hand correctly on the home keys because of the distance through which the hand must move. This problem increases the stress on users and lowers their work efficiency.

One prior art solution to this problem is to mount a track ball device on the keyboard. The track ball device replaces the mouse. Whereas, the track ball device does solve the problem, very few keyboards incorporate that device because of increase cost and because it results in a non-standard keyboard.

There exists a need for a mechanism which will allow the mouse to be closer to the right hand and which can be easily fitted to existing keyboards.

SUMMARY OF THE INVENTION

The solution to this problem is a mouse platform that mounts over the normally unused portion of the keyboard where the mouse is easily accessible by the right hand of the user. Further, the platform is easily removable to allow use of the normally unused portion of keyboard for the few programs that require such use. In one embodiment, the platform rests on the same surface as the keyboard but extends over the normally unused portion of the keyboard. In a second embodiment, a first part of the platform is affixed to the keyboard, a second part of the platform can be easily attached and removed from the first part. The second part is the surface on which the mouse rests. Advantageously, in the second embodiment, the first part may be Velcro strips which are glued onto the keyboard with the second part having matching Velcro strips. In a third embodiment, the second part is adjustable to compensate for the keyboard being tilted.

DETAILED DESCRIPTION

Figure 1:
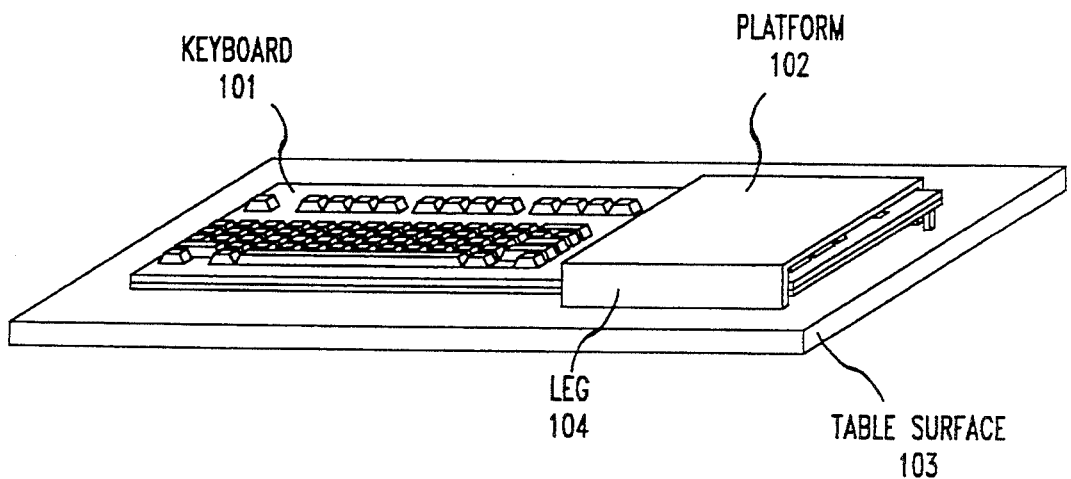
FIG. 1 shows a perspective view of a keyboard with a mouse platform in accordance with a first embodiment of the invention being positioned over the keyboard.
Figure 2:
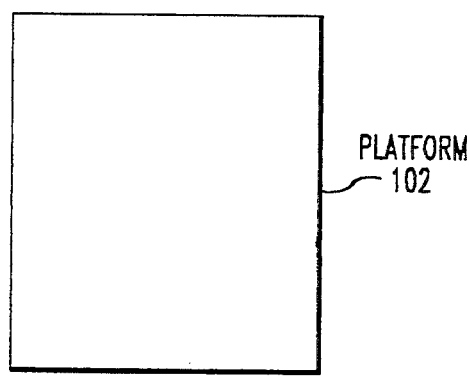
FIG. 2 illustrates a top view of the platform of FIG. 1.
Figure 3:
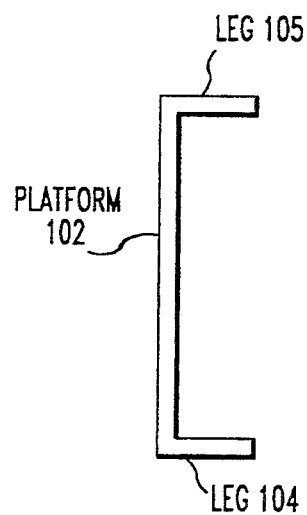
FIG. 3 illustrates a side view of the platform FIG. 1.

FIG. 1 illustrate a perspective view of a first embodiment of the invention. Keyboard 101 is supported by table surface 103, and platform 102 is supported by table surface 103 via legs 104 and 105. The computer mouse utilized with keyboard 101 operates on platform 102. FIGS. 2 and 3 illustrate platform 102 and legs 104 and 105 in greater detail. With respect to FIG. 3 which is a side view of platform 102, it can be seen that legs 104 and 105 have the same length. This length is great enough to position platform 102 just above the keys of keyboard 101 which are under platform 102 of FIG. 1. Also, since legs 104 and 105 are the same length, platform 102 is horizontal with respect to table surface 103. The top surface of platform 102 is approximately 5.5 by 7 inches and is positioned no more that 3 inches above the keys of the keyboard.

One skilled in the art can readily see that platform 102 could be made larger or smaller to provide more or less work surface for the mouse; however, experimentation has shown that a surface area of 5.5 by 7 inches is adequate for the utilization of a mouse. Platform 102 can be utilized when keyboard 101 is either horizontal to table surface 103 or is tilted so that keyboard 101 is at a slight angle to table surface 103.

Figure 4:
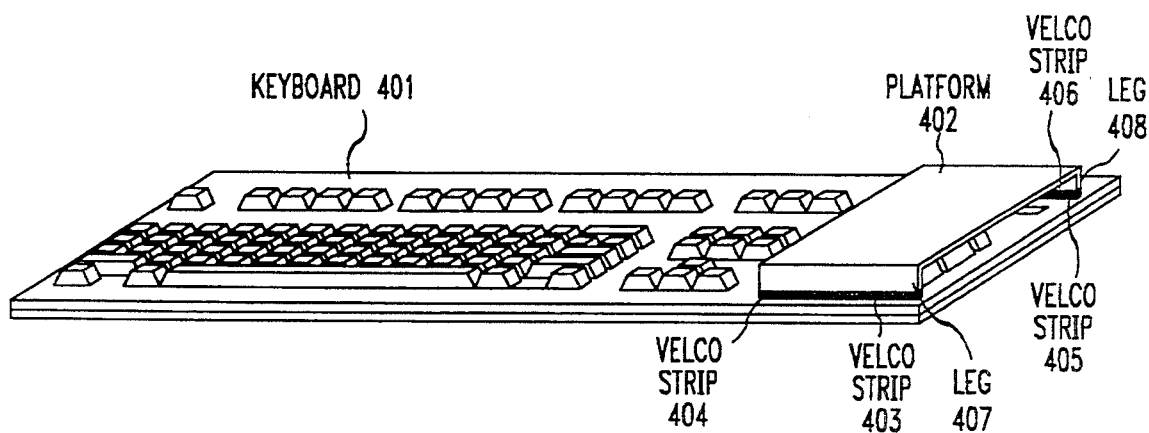
FIG. 4 shows a perspective view of a keyboard with a mouse platform being positioned off the keyboard in accordance with a second embodiment of the invention.
Figure 5:
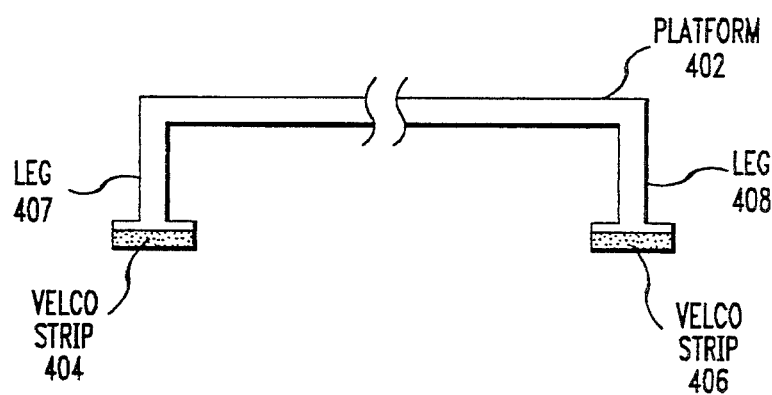
FIG. 5 illustrates a side view of the platform of FIG. 4.

FIG. 4 illustrates a perspective view of a second embodiment of the invention. Platform 402 is designed to be used with keyboard 401 when keyboard 401 is horizontal to the surface upon which the keyboard is resting. Platform 402 is mounted directly on keyboard 401. This is done by gluing or otherwise attaching velcro strips 403 and 405 to keyboard 401. Legs 407 and 408 of platform 402 have matching velcro strips—velcro strips 404 and 406. Hence, when legs 407 and 408 are placed in contact with velcro strips 403 and 405, platform 402 is then secured to keyboard 401. The second embodiment has the advantage that platform 402 has a fixed position with respect to keyboard 401, when keyboard 401 is moved. FIG. 5 shows a side view of platform 402. Platform 402 can advantageously be fabricated from metal or plastics or other materials utilized for the fabrication of items like platform 402.

One skilled in the art could readily envision other methods of securing platform 402 to keyboard 401 other then the use of velcro strips. Further, one skilled in the art could readily see that by varying the lengths of legs 407 and 408 with respect to each other and the angle between these legs and platform 402, that platform 402 could be adapted for keyboard 401 being tilted with respect to the surface on which keyboard 401 is resting. In addition, one skilled in the art could readily envision that only one velcro strip or other means of securement for attaching platform 402 to keyboard 401 could be used.

Figure 6:
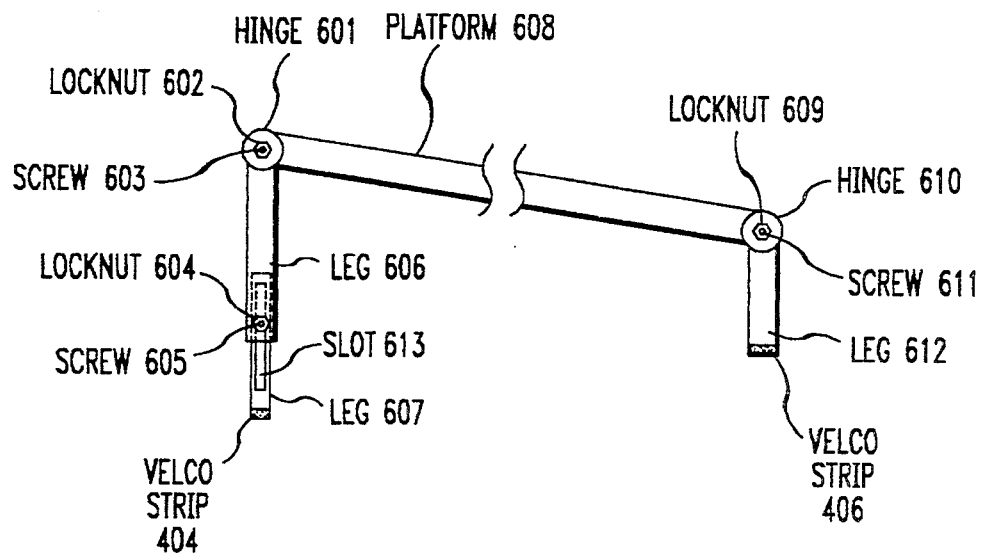
FIG. 6 illustrates a side view of a platform of a third embodiment of the invention that adjusts to the tilting the keyboard.

FIG. 6 illustrates a side view of an apparatus platform that can be attached to the velcro strips 403 and 405 that are glued on keyboard 401 of FIG. 4. This apparatus is manually adjustable to keyboard 401 being tilted or not tilted. These adjustments are performed by hinges 601 and 610 and adjustable leg 607 which slides up and down within leg 606. A user of platform 608 secures the latter platform onto keyboard 401 and then adjusts the height of platform 608 above keyboard 401 by movement of leg 607 within leg 606. By adjusting leg 607, the user levels platform 608 with respect to the table surface on which keyboard 401 is resting. Once platform 608 has been secured and leveled, lock nuts 609, 602, and 604 are tightened sufficiently to create enough friction to hold hinge 601, hinge 610, and leg 607 securely in position.

Figure 7:
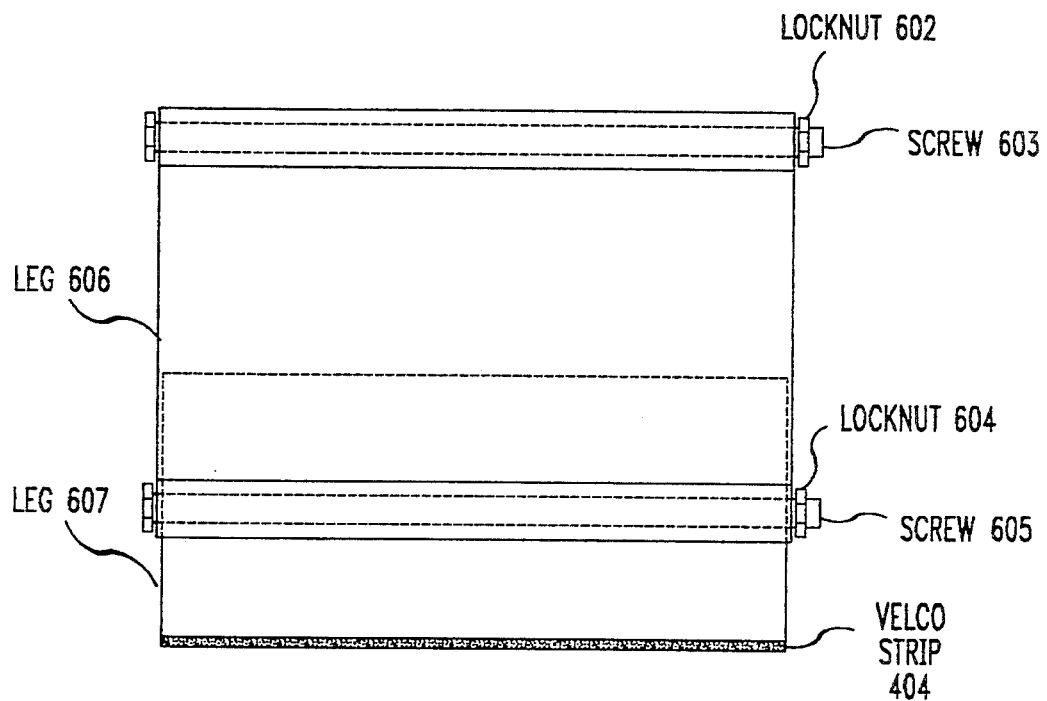
FIG. 7 illustrates a front view of the platform of FIG. 6.

FIG. 7 shows a front view of parts 602 through 607 of FIG. 6. From FIG. 7, it can be seen that hinge 601 is secured to leg 606 and platform 608 by screw 603 being positioned through hinge 601. When lock nut 602 is tightened so as to come in contact with hinge 601, this increases the friction on the movement of hinge 601 to the point where hinge 601 is secured and does not move during the operation of the mouse on platform 608. From FIG. 7, it can also be seen that leg 606 slides up and down in leg 606 with screw 605 extending through leg 606 and 607. Leg 607 has slot 613 which allows for leg 607 to move up and down with screw 605 position through leg 607.

One skilled in the art could readily come up with other hinges and methods for adjusting the legs of platform 615. In addition, other mechanisms are well known in the art for securing the hinges and legs illustrated in FIGS. 6 and 7.

I claim:

1. An apparatus in combination with a keyboard for supporting a computer mouse above the keyboard, comprising:

a platform positioned directly above a portion of the keyboard supported by a plurality of legs and the platform providing a surface on which to manipulate the computer mouse and placing the computer mouse in close proximity to the keyboard; wherein the keyboard has a length along a longitudinal axis of the keyboard and the platform also having a length along a longitudinal axis of the platform, and the length of the platform is less than half the length of the keyboard.

2. The apparatus of claim 1 wherein the platform places the computer mouse a maximum of three inches above the keys of the keyboard.

3. The apparatus of claim 2 wherein the legs rest on the same surface that supports the keyboard.

4. The apparatus of claim 2 wherein the legs rest on the keyboard.

5. The apparatus of claim 4 wherein supports are attached to the keyboard and the legs have mating supports that attach to the supports attached to the keyboard to secure the legs to the keyboard.

6. The apparatus of claim 5 wherein the supports and mating supports are velcro strips.

7. The apparatus of claim 4 wherein the angles between the legs and the platform are adjustable by movement of the legs, and the length of at least one leg is adjustable whereby the platform can be made horizon to a surface upon which the keyboard is resting when the keyboard is tilted with respect to the surface.

8. The apparatus of claim 7 wherein the adjustable leg comprises a mechanism for securing the length of the leg after adjustment.

9. The apparatus of claim 8 wherein hinges provide the adjustment for the angles between the legs and platform, and the hinges each comprises a mechanism for securing the angles between the legs and platform.

* * * * *